(12) United States Patent
Blunk et al.

(10) Patent No.: US 8,304,143 B2
(45) Date of Patent: Nov. 6, 2012

(54) CONDUCTIVE AND HYDROPHILIC COATING FOR PEMFC BIPOLAR PLATE

(75) Inventors: Richard H. Blunk, Macomb Township, MI (US); Feng Zhong, Troy, MI (US); Tina T. Salguero, West Hills, CA (US); Kevin W. Kirby, Calabasas Hills, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 12/623,465

(22) Filed: Nov. 23, 2009

(65) Prior Publication Data

US 2010/0136462 A1  Jun. 3, 2010

Related U.S. Application Data

(60) Provisional application No. 61/117,812, filed on Nov. 25, 2008.

(51) Int. Cl.
*H01M 8/02* (2006.01)

(52) U.S. Cl. ......... 429/518; 429/517; 428/447; 428/448

(58) Field of Classification Search .................. None
See application file for complete search history.

(56) References Cited

U.S. PATENT DOCUMENTS

| | | |
|---|---|---|
| 5,554,739 A | 9/1996 | Belmont |
| 5,922,118 A | 7/1999 | Johnson et al. |
| 2005/0008919 A1* | 1/2005 | Extrand .................. 429/34 |
| 2005/0214196 A1 | 9/2005 | Ohashi et al. |
| 2005/0288425 A1* | 12/2005 | Lee et al. ............... 524/494 |
| 2006/0257555 A1* | 11/2006 | Brady et al. ............ 427/115 |
| 2007/0238006 A1 | 10/2007 | Vyas et al. |
| 2007/0298267 A1 | 12/2007 | Zhong et al. |
| 2009/0286132 A1 | 11/2009 | Blunk et al. |
| 2011/0014548 A1 | 1/2011 | Blunk et al. |

* cited by examiner

*Primary Examiner* — John S Maples
(74) *Attorney, Agent, or Firm* — Brooks Kushman P.C.

(57) ABSTRACT

An electrically conductive plate for fuel cell applications comprises a plate body having at least one channel-defining surface and an electrically conductive hydrophilic layer disposed over at least a portion of the channel-defining surface. The electrically conductive layer includes residues of a silane coupling agent and electrically conductive hydrophilic carbon.

13 Claims, 6 Drawing Sheets

Durability of BTSE with HRL C in Dry Contion (80C, 1% Relative Humidity)

| | Sample # | Initial CA* | Dry oven bake at 80°C | | | | Resoak in H₂O at 80°C |
|---|---|---|---|---|---|---|---|
| | | | 24 hrs | 48 hrs | 192 hrs | 504 hrs | 360 hrs |
| BTSE alone 30 min Cure | 2 | 12 | 14 | 17 | 23 | 27 | 21 |
| BTSE with C 5 min Cure | 23 | <10 (NC) | <10 (NC) | 21 | 20 (NC) | 32 (NC) | 10 (NC) |
| BTSE with C 10 min Cure | 24 | <10 (NC) | <12 (NC) | 14 (NC) | 21 (NC) | 22 (NC) | 11 (NC) |
| BTSE with C 15 min Cure | 33 | <10 | <10 | <10 (NC) | 16 (NC) | 17 (NC) | <10 (NC) |
| BTSE with C | 34 | <10 | <10 (NC) | <10 (NC) | 15 (NC) | 40 (NC) | <10 (NC) |
| BTSE with C | 43 | <10 | <10 (NC) | <10 | <10 (NC) | 10 (NC) | <10 (NC) |
| BTSE with C | 44 | <10 | <10 | <10 | 14 (NC) | 15 (NC) | <10 (NC) |
| BTSE with C 30 min Cure | 3 | | | | 11 | 19 | |

Figure 5

CONDUCTIVE AND HYDROPHILIC COATING FOR PEMFC BIPOLAR PLATE

CROSS-REFERENCE TO RELATED APPLICATIONS

This application claims the benefit of U.S. provisional application Ser. No. 61/117,812, filed Nov. 25, 2008.

BACKGROUND OF THE INVENTION

1. Field of the Invention

The present invention is related to fuel cell bipolar plates with improved conductivity and hydrophilicity and methods for making such plates.

2. Background Art

Fuel cells represent a clean alternative to current technologies using fossil fuel resources. Polymer electrolyte membrane ("PEM") fuel cells have gained prominence and are found in a wide range of applications due to their high power density, quick start-up and compatibility with automotive applications.

PEM fuel cells typically have a solid polymer membrane with anode and cathode catalytic layers deposited on the opposite faces of the membrane. The combination of catalytic mixtures and the membrane defines a membrane electrode assembly ("MEA"). MEA's are relatively expensive to manufacture and require certain conditions for effective operation. In order to produce electricity efficiently, the polymer electrolyte membrane of a PEM fuel cell must be thin, chemically stable, proton transmissive, non-electrically conductive and gas impermeable. The electrodes in the MEA must be chemically inert, electrically conductive and stable. Typically, the electrodes are made of porous finely divided catalytic particles (for example, platinum) supported on carbon particles and mixed with an ionomer. In a typical operation of a fuel cell, at the anode, a platinum-containing catalyst stimulates dissociation of the fuel to hydrogen protons and electrons. The electrons migrate to the cathode via an external circuit and create an electrical current. The hydrogen protons migrate through the membrane to the cathode completing the overall reaction. At the same time, oxygen in pure form ($O_2$) or air (a mixture of $O_2$ and $N_2$) is being fed to the cathode, where a catalyst stimulates formation of oxygen ions that react with hydrogen protons, creating water and heat as byproducts.

Another component of the PEM cell is a gas diffusion layer ("GDL"). There is one GDL on the side of each electrode, made of a porous, electrically conductive and gas impermeable material (usually wet-proofed carbon cloth or carbon paper). The GDL provides electrical contact between the electrodes and the bipolar plates. The porous nature of the GDL material ensures effective and uniform access of the fuel and oxidant to the surface of the catalyzed membrane. The GDL also assists in water management of the cell by allowing the appropriate amount of water vapor to reach the MEA, thus preventing loss of ionic conduction by keeping the membrane humidified.

Several fuel cells are usually combined in a fuel cell stack to generate the desired power, and fuel stacks can be arranged to form a multi-stack array. Such a fuel cell stack includes a series of bipolar plates, also known as flow field plates, positioned between adjacent fuel cells in the stack. The MEA/GDL assembly is sealed between a pair of bipolar plates, which typically have several important functions: (1) to distribute the fuel and oxidant within the cell using flow channels on both sides, (2) to facilitate water management within the cell, (3) to separate the individual cells in the stack and act as a support structure (4) to carry electrical current away from the interior to the exterior of each cell, (5) to conduct heat away from the cell. Plate topologies (such as surface features), materials and coatings facilitate these functions and protect the plates from a hostile operating environment of very low pH and high temperatures. There are several alternative conductive materials for the bipolar plates, such as non-porous graphite, stainless steel, aluminum, and metal- or carbon-based composites. Metal bipolar plates typically produce a natural oxide on their outer surface that makes them resistant to corrosion. However, this oxide layer is not conductive, and thus increases the internal resistance of the fuel cell, reducing its electrical performance.

Bipolar plates represent a significant portion of fuel cell cost and constitute the dominant weight of the cell stack. The potential benefits of improved efficiency of the system enable the formation of smaller stacks, decrease in packaging requirements and lowering costs, which lead to increased applicability of PEM fuel cells in the automotive industry.

During the operation of the fuel cell, especially at low power demands, moisture in the form of droplets accumulates within the flow channels of the bipolar plate. Droplets continue to expand due to the typically hydrophobic nature of the channel surface and block the passage of the reactant gases through the flow channels. Thus, areas of the membrane deprived of the reactant gas will not generate electricity resulting in a reduction of the overall efficiency of the fuel cell to the point of the cell failure. Typically, the problem might be somewhat alleviated by purging the water from the flow channels using hydrogen gas or by reducing inlet reactant gas humidification. Both of these solutions have disadvantages, such as a reduction in fuel economy and in long-term durability of the membrane. As is well understood in the art, hydrophilic coating may be applied to the surface of the flow channel to improve channel water transport. A hydrophilic coating causes water to spread along its surface in a process of spontaneous wetting and form a thin film. The thin film tends to cause less obstruction of the gas flow in the channel system and eventually water is transported along the channel toward the outlet by capillary forces.

Typical conductive coatings employed to reduce the contact resistance on a plate surface include relatively costly materials such as gold and its alloys, and composite polymeric materials, which require costly production equipment. Current hydrophilic coatings are mainly nanoparticulate silicas, or organic-based particles. However, these coatings are unstable over time, do not adhere well to the substrate material of the plate and are expensive to manufacture.

Accordingly, there is a need for improved methodology for producing coatings that combine excellent mechanical properties with enhanced electrical conductivity and hydrophilicity.

SUMMARY OF THE INVENTION

The present invention solves one or more problems of the prior art by providing in at least one embodiment electrically conductive plates that are useful in fuel cell applications. The plates of this embodiment are useful as either bipolar or unipolar plates. The plates include a plate body having at least one channel-defining surface and an electrically conductive hydrophilic layer disposed over at least a portion of the channel-defining surface. The electrically conductive layer includes residues of a silane coupling agent and electrically conductive hydrophilic carbon.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 5 provides a table showing the contact angle for Au coated stainless steel coupons coated with compositions containing BTSE and BTSE/hydrophilic carbon.

DETAILED DESCRIPTION OF THE PREFERRED EMBODIMENT(S)

Figure 1:
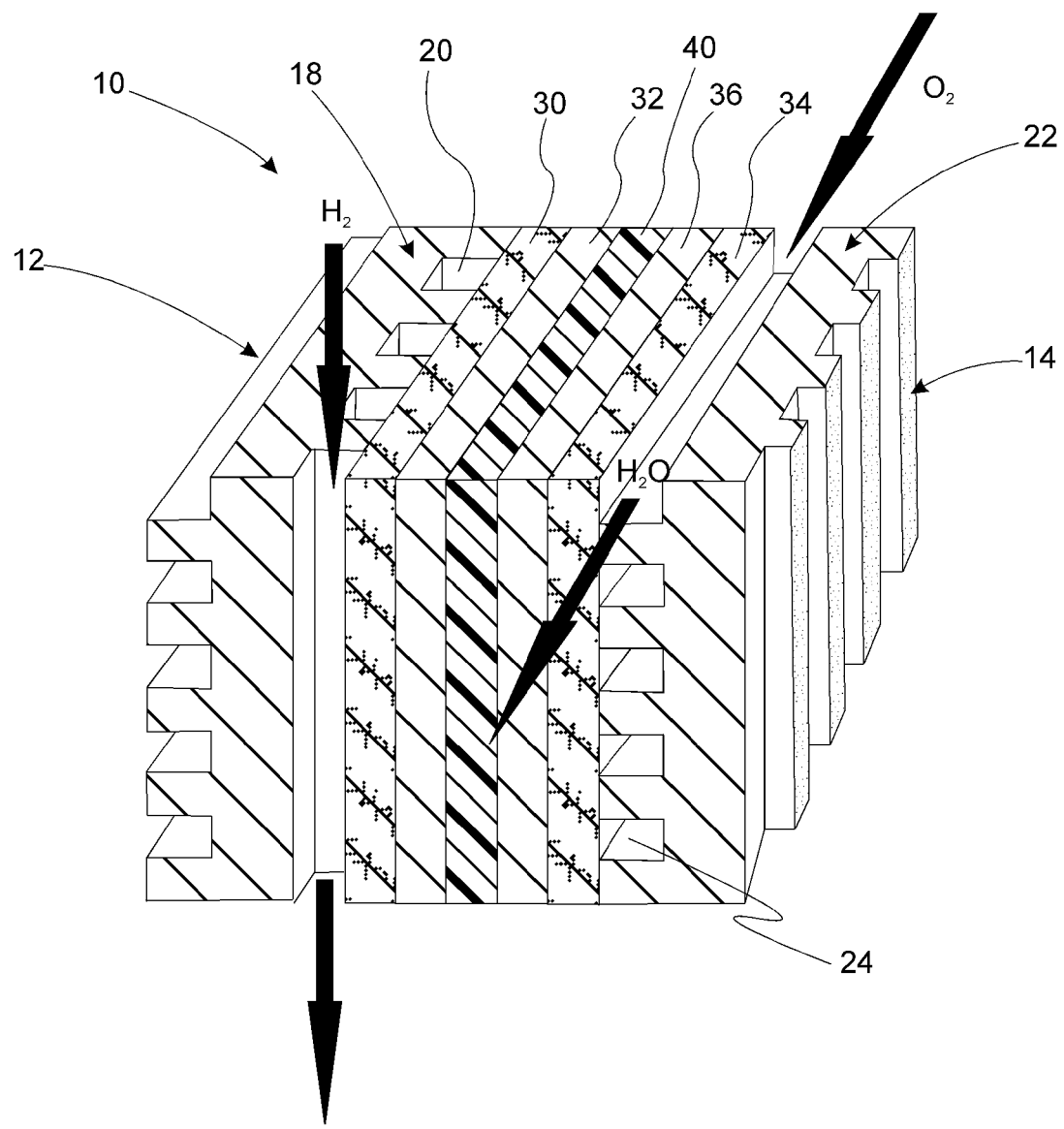
FIG. 1 is a perspective view of a fuel cell incorporating the bipolar plates of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The following description of the embodiment(s) is merely exemplary in nature and is in no way intended to limit the invention, its application, or uses.

With reference to FIG. 1, a perspective view of a fuel cell incorporating the bipolar plates of the present embodiment is provided. PEM fuel cell 10 includes bipolar plates 12, 14. Fuel cell 10 is of a stackable design. In a fuel cell stack comprising a plurality of fuel cells, it is recognized that unipolar plates replace bipolar plates on the ends. Plates 12, 14 are formed from a metal, a metal alloy, or composite material, and are therefore electrically conductive. Within bipolar plate 12, anode flow field 18 includes one or more channels 20 for introducing a first gas to the fuel cell 10. Similarly, bipolar plate 14 includes cathode gas flow field 22, which includes one or more channels 24 for introducing a second gas into fuel cell 10. Typically, the first gas includes a fuel such as hydrogen while the second gas includes an oxidant such as oxygen. Anode diffusion layer 30 is positioned between anode flow field 18 and anode layer 32 while cathode diffusion layer 34 is positioned between cathode flow field 22 and cathode layer 36. Polymeric ion conductive membrane 40 is interposed between anode layer 32 and cathode layer 36.

Figure 2A:
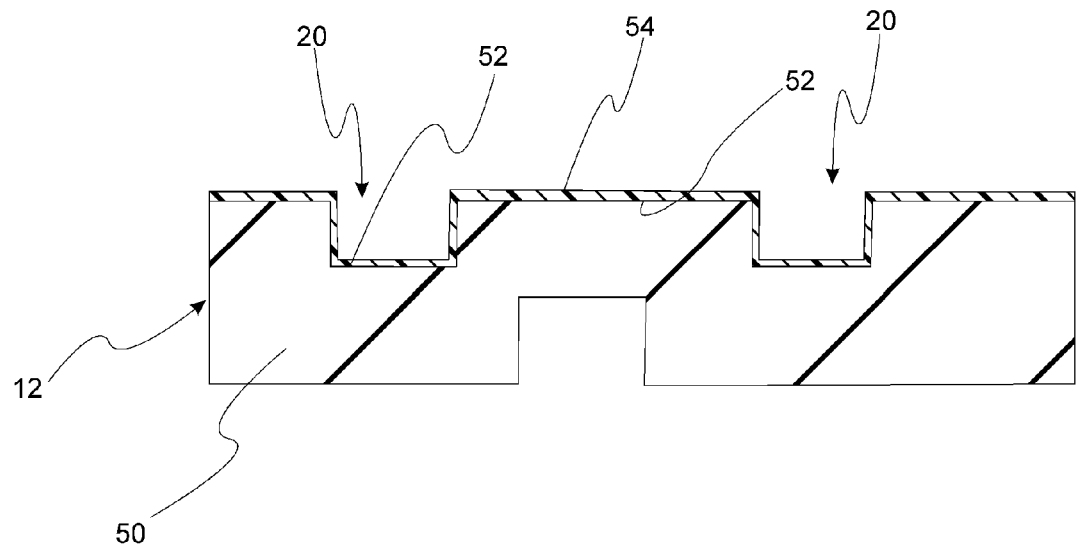
FIG. 2A is a schematic illustration of a variation of the bipolar plates of the invention.
Figure 2B:
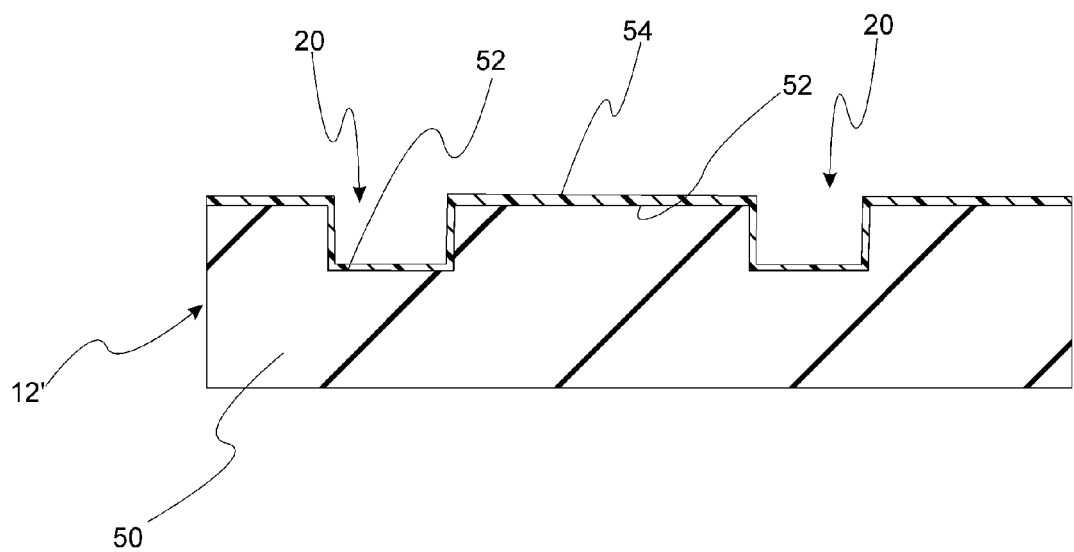
FIG. 2B is a schematic illustration of a variation of the unipolar plates of the invention.

With reference to FIGS. 2A and 2B, a schematic illustration of a variation of bipolar and unipolar plates of the invention is provided. FIG. 2A provides a schematic of a bipolar plate while FIG. 2B provides a schematic of a unipolar plate. Bipolar plate 12 includes plate body 50 having channel-defining surface 52. First hydrophilic and electrically conductive layer 54 is disposed over at least a portion of surface 52 of plate body 50. First layer 54 comprises residues of a silane coupling agent and electrically conductive hydrophilic carbon. In this context, residue of a silane-coupling agent means the chemical moieties that remain on a surface after treatment with a composition that includes a silane-coupling agent. Similarly, unipolar plate 12' includes plate body 50 having channel-defining surface 52. First hydrophilic and electrically conductive layer 54 is disposed over at least a portion of surface 52 of plate body 50. First layer 54 comprises residues of a silane coupling agent and electrically conductive hydrophilic carbon. In this context, residue of a silane-coupling agent means the chemical moieties that remain on a surface after treatment with a composition that includes a silane-coupling agent.

Still referring to FIGS. 2A and 2B, channel-defining surface 52 defines fluid flow channels 20 configured to distribute flow of a fluid across at least one side of the plate 12. In particular, the coated portions of surface 52 are advantageously located within flow channels 20 in order to prevent agglomeration of water in the flow channels.

Figure 3A:
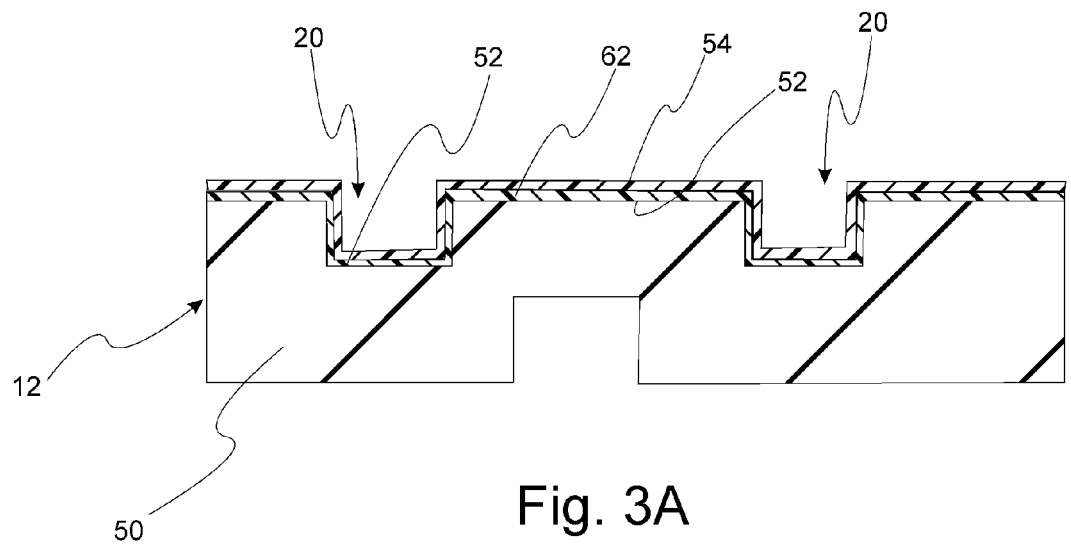
FIG. 3A is a schematic illustration of another variation of the bipolar plates of the invention.
Figure 3B:
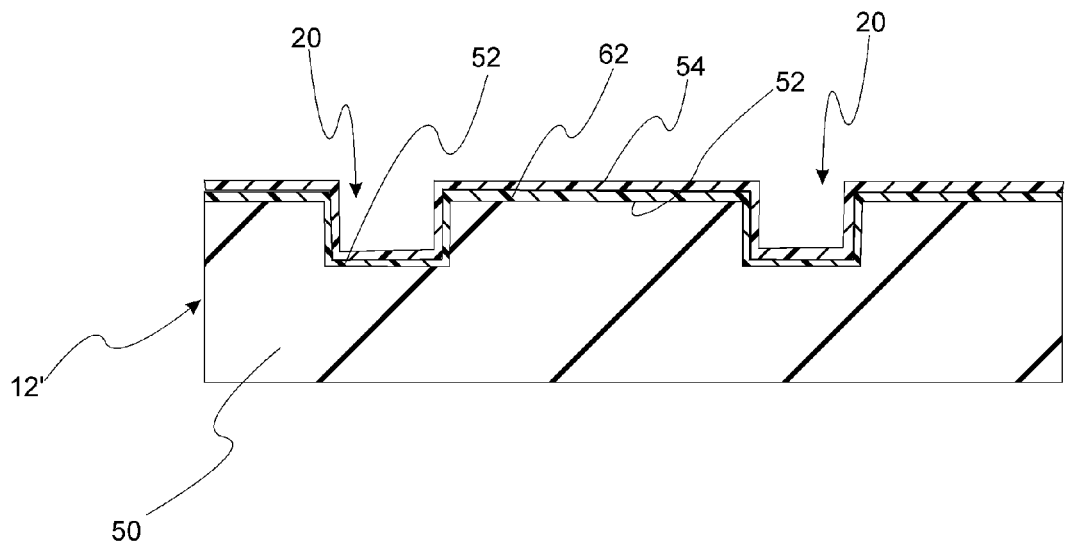
FIG. 3B is a schematic illustration of another variation of the unipolar plates of the invention.

With reference to FIGS. 3A and 3B, additional variations of the present embodiment are provided. FIG. 3A provides a schematic of a bipolar plate while FIG. 3B provides a schematic of a unipolar plate. Bipolar plate 12 further includes conductive coating 62 disposed between bipolar plate 12 and first hydrophilic layer 54. Similarly, bipolar plate 12 further includes conductive coating 62 disposed between bipolar plate 12 and first hydrophilic layer 54. The conductive coating of the present variation can be made of any suitable material. In a refinement of such variation, such conductive coating includes an unreactive precious metal (e.g., gold, platinum, palladium, etc) or stable conductive coatings such as carbon, titanium oxynitride and other conductive metal oxides.

In a refinement of the present embodiment, the amount of residues of a silane-coupling agent and the concentration of the electrically conductive hydrophilic carbon are such that portions of channel-defining surface 52 coated with first layer 54 have a contact angle less than a predetermined value (when uncoated). In another refinement, the contact angle is less than about 30 degrees. In yet another refinement, the contact angle is less than about 20 degrees. In still another refinement, the contact angle is less than about 10 degrees. In another refinement, the concentration of the electrically conductive particles is in a sufficient amount such that the contact resistance of the first hydrophilic and electrically conductive layer 54 is from about 5 to about 40 mohm-cm². In another refinement, the resistance is from about 10 to about 30 mohm-cm² when contacted to a gas diffusion layer at a compression pressure of 200 psi.

As set forth above, the present embodiment includes electrically conductive hydrophilic carbon. In a refinement of the present embodiment, the hydrophilic carbon comprises a carbon component with an appended hydrophilic component. The carbon component is selected from any carbon source that is combinable with a silane-coupling agent. Examples of suitable carbon components include, but are not limited to, carbon black, graphite, carbon fiber, amorphous carbon, carbon nanotubes, graphene sheets, and combinations thereof. In another variation, the hydrophilic component includes moieties that include O, N, F, and Cl. In another refinement, the hydrophilic components include one or more of: OR, COR, COOR, OCOR, COOM, halogen, CN, NR$_2$, SN SO$_3$H, SO$_3$M, NR(COR), CONR$_2$, NO$_2$, PO$_3$H$_2$, PO$_3$HM, NR$_3^+$X$^-$, and PR$_3^+$X$^-$, where R is independently H, C1-C20 alkyl, or aryl; n is an integer from 1 to 8; M is a metal (Na, K, Li, etc); and X— is a halide anion or anion derived from a mineral or organic acid. Examples of hydrophilic carbons that are used in the present embodiment are commercially available from Cabot Corporation located in Billerica Mass. A useful carbon is Cabot Corporation's is the CAB-O-JET 200 (modified carbon black dispersion having hydroxy- and 4-sulfophenyl groups), CAB-O-JET 352K, and CAB-O-JET 300).

In a further refinement, the appended hydrophilic component comprises a hydrophilic organic group. Examples of appended hydrophilic organic groups are described by the following formula:

HG(Ar)

wherein:

— represents the bond to the carbon component;
HG is a hydrophilic a hydrophilic group. Examples of such hydrophilic groups include OR, COR, COOR, OCOR, COOM, halogen, CN, NR$_2$, SN SO$_3$H, SO$_3$M, NR(COR), CONR$_2$, NO$_2$, PO$_3$H$_2$, PO$_3$HM, NR$_3^+$X$^-$, and PR$_3^+$X$^-$, where R is independently H, C1-C20 alkyl, or aryl; n is an integer from 1 to 8; M is a metal (Na, K, Li, etc); and X— is a halide anion or anion derived from a mineral or organic acid; and Ar is absent or an aromatic group. Examples of suitable aromatic groups include phenyl, napththyl, anthracenyl, phenanthrenyl, biphenyl, pyridinyl, benzyl, and the like. The hydrophilic organic groups of the present refinement are appended to the carbon component via diazonium salts as set forth in U.S. Pat. Nos. 5,554,739 and 5,922,118. The entire disclosures of these patent applications are hereby incorporated by reference.

Specific examples of appended hydrophilic component include, but are not limited to, functional groups derived from a carboxylic acid, a benzenesulfonic acid, an alcohol, an amine, amide, poly(ethylene oxide), ethoxyl, methoxyl, phosphonic acid, naphthenesulfonic acid, salicylic acid, phenylphosphonic acid, benzoic acid, phthalic acid group, a salt of any of the above mentioned acids, and combinations thereof. In this context, the phrase "functional groups derived from" means that a chemical moiety is attached to the carbon component with a resulting structure that is formally obtained by removing a hydrogen from the group being attached and connecting the resulting radical to the carbon.

In another refinement of these variations, the silane coupling agent used to form the residues in the hydrophilic layer has formula I:

$$Q^1\text{-}Q^2\text{-}Si(R^1)_3 \qquad\qquad\qquad\qquad\qquad I$$

wherein:

R$^1$ is a chemical moiety that can be hydrolyzed and polymerized using sol-gel chemistry. In a refinement, R$^1$ is an alkoxy or halogen. In another refinement, R$^1$ is a C1-6 alkoxy or chlorine.

Q$^1$ is a moiety having one or more atoms that hydrogen bond or have energetically favorable interactions with water such that a surface treated with the coupling agent is hydrophilic with a contact angle within the ranges cited herein; and Q$^2$ is a hydrocarbon-containing moiety providing a spatial separation between Q$^1$ and the Si(R$^1$)$_3$ group. In one refinement, Q$^2$ includes alkanes, aromatic rings, amines, ethers, and polymers. Optionally, Q$^2$ is further substituted with additional reactive Si groups or with non-reactive chemical moieties.

In another variation of the present invention, the silane-coupling agent has formula II:

$$(R^1)_3SiQ^2Si(R^1)_3 \qquad\qquad\qquad\qquad\qquad II$$

wherein:

R$^1$ is a chemical moiety that can be hydrolyzed and polymerized using sol-gel chemistry. In a refinement, R$^1$ is an alkoxy or halogen. In another refinement, R$^1$ is a C$_{1-6}$ alkoxy or chlorine; and Q$^2$ is a hydrocarbon-containing moiety providing a spatial separation between Q$^1$ and the Si(R$^1$)$_3$ group. In one refinement, Q$^2$ includes alkanes, aromatic rings, amines, ethers, and polymers. Optionally, Q$^2$ is further substituted with additional reactive Si groups or with non-reactive chemical moieties. Typically, Q$^2$ is linked to the silicon centers through C—Si or O—Si bonding.

In another variation of the present invention, the silane-coupling agent is selected from the group of compounds having formulae III-VII:

$(R^1)_3Si-(CH_2)_o-Si(R^1)_3$   III $X-(CH_2)_o-Si(OR^1)_3$   IV

V

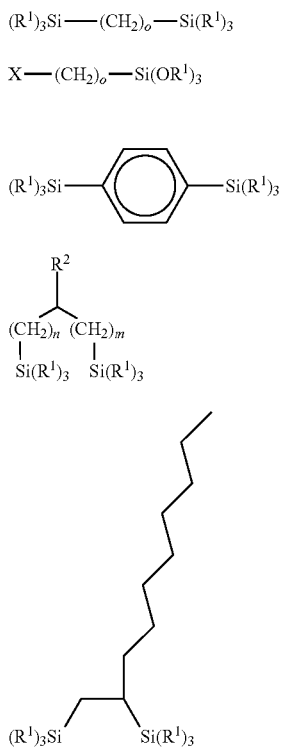

VI

VII wherein:
R¹ is the same as set forth above;
X is a halogen. In a particularly useful refinement, X is Cl; m, n, and o are each independently an integer from 0 to 10. In a refinement, m, n, and o are each independently an integer from 0 to 5. In still another embodiment, m, n, and o are each independently an integer from 0 to 3.

Examples of useful silane coupling agents that have additional functional groups in the linker $Q^1$ are provided in formulae VIII-XI:

In still another variation of the present invention, the silane-coupling agent is described by formula XII:

$(R^1O)_3Si\underset{(CH_2)_n}{\diagdown}O\underset{(CH_2)_n}{\diagup}Si(OR^1)_3$   XII wherein:
R¹ is the same as set forth above; and
n is integer from 0 to 10.

Figure 4:
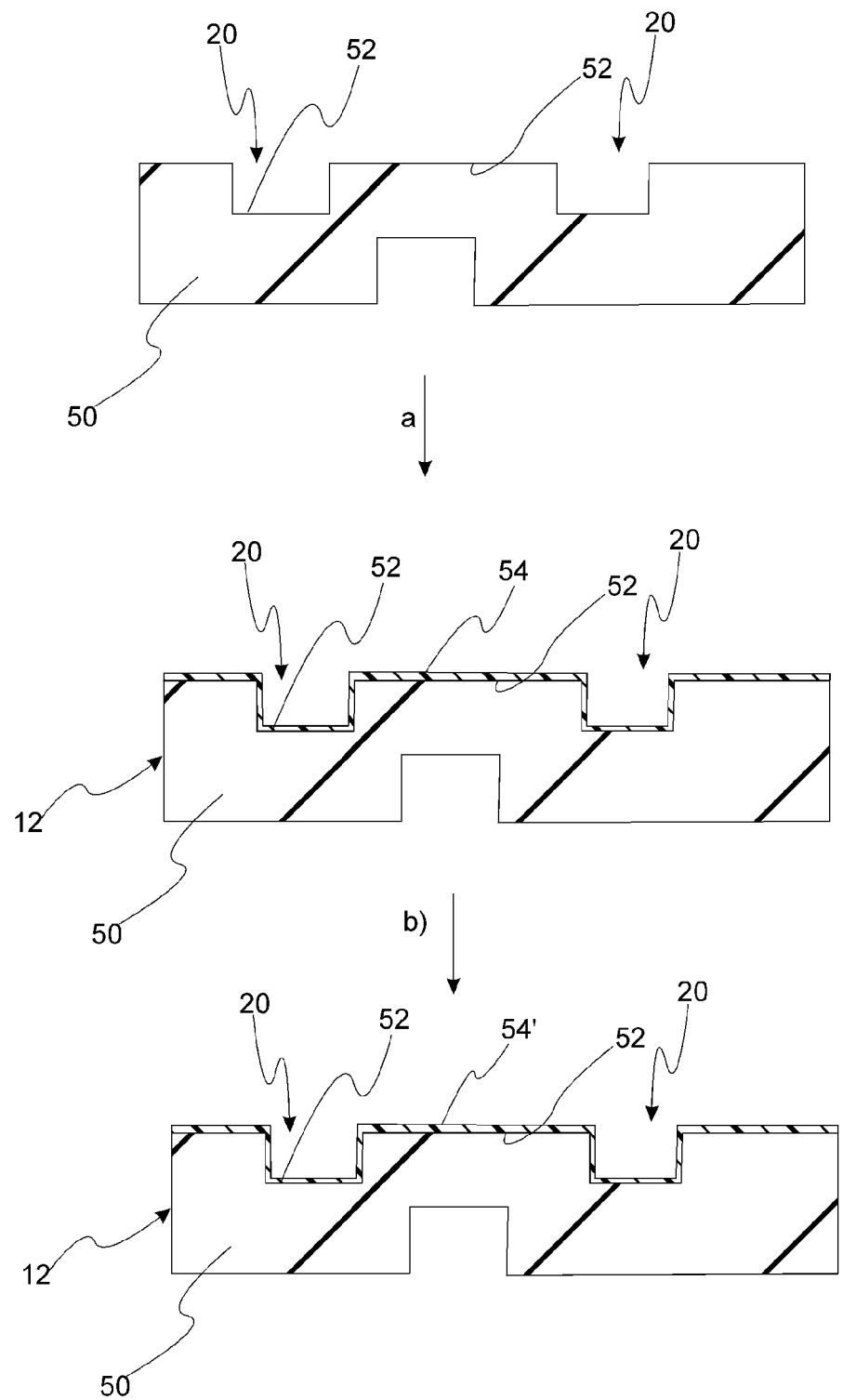
FIG. 4 provides a flowchart illustrating the preparation of bipolar plates having a hydrophilic and electrically conductive coating.

With reference to FIG. 4, a method of forming the plates described above is provided. Although FIG. 4 depicts a bipolar plate, extension to a unipolar plate is straightforward. Plate body 50 includes channel-defining surface 52, which defines channels 20. In step a), plate body 50 is contacted with a composition comprising a silane coupling agent and electrically conductive hydrophilic carbon. The carbon ratio in the silane coupling agent solution ranges from 0.1 to 5 percent of the total weight of the composition. The composition is then cured to form unactivated first layer 54 on plate body 50. In a variation of the present embodiment, first layer 54 is then contacted with an acid composition or with de-ionized water at elevated temperature to form activated first coating 54' in step b). Although the present invention is not dependent upon any particular mechanism, it is believed that in this activation step condensed and hydrophobic siloxane groups at the exposed surface of first coating 54 surface are hydrolyzed to hydrophilic silanol groups.

The following examples illustrate the various embodiments of the present invention. Those skilled in the art will recognize many variations that are within the spirit of the present invention and scope of the claims.

A mixture of 6.0 mL ethanol, 0.72 mL water, 4.65 mL bis-1,2-(triethoxysilyl)ethane "BTSE", and 0.125 mL 0.5 M sulfuric acid is aged at room temperature for about 20 minutes to form a stock solution. PSA-C (phenylsulfonic acid-modified carbon black) is added to the stock solution and ultrasonicated for 10 minutes to provide good dispersion. Sufficient PSA-C is added so that the concentration is 3.6 g/L. Coatings are formed by a single dip followed by air drying for about 1 minute and oven curing at 120° C. for about 30 minutes. The samples are then water soaked for 12 hrs at 80° C.

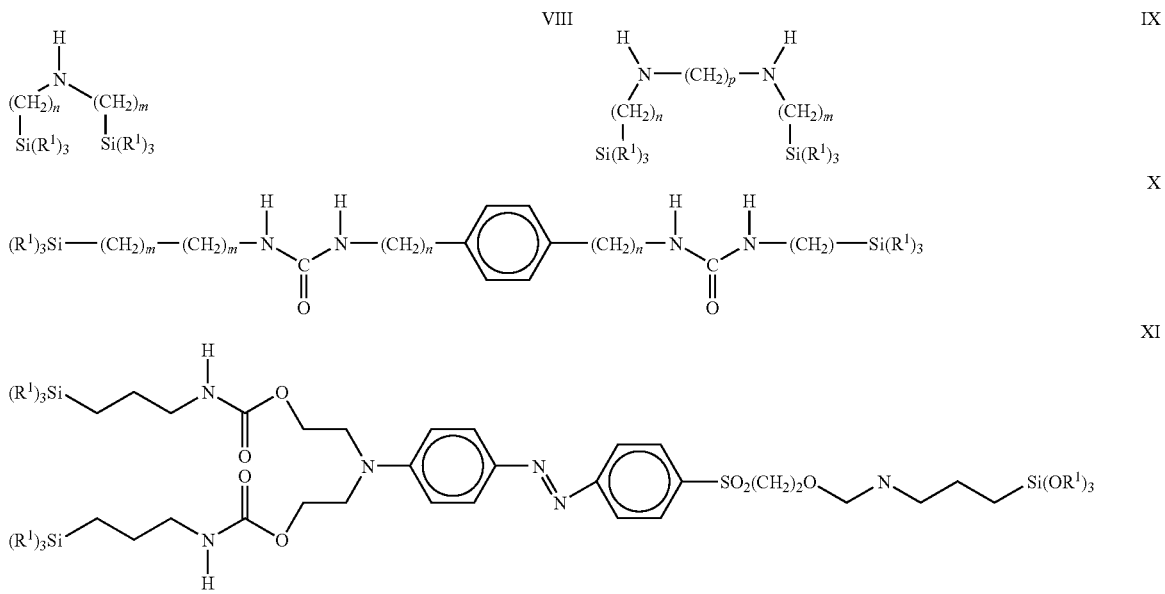

FIG. 5 provides a table showing the contact angle for Au coated-stainless steel coupons coated with compositions containing BTSE and BTSE/hydrophilic carbon. In nearly every instance, the samples were observed to have contact angles less than 30 degrees. Baking tended to increase the contact angles. As indicated in the table, several samples show a noncircular ("nc") spreading out of a water droplet. Significantly, rehydration after baking is observed to decrease the contact angle in the samples with hydrophilic carbon to a greater extent than the samples without hydrophilic carbon.

Figure 6:
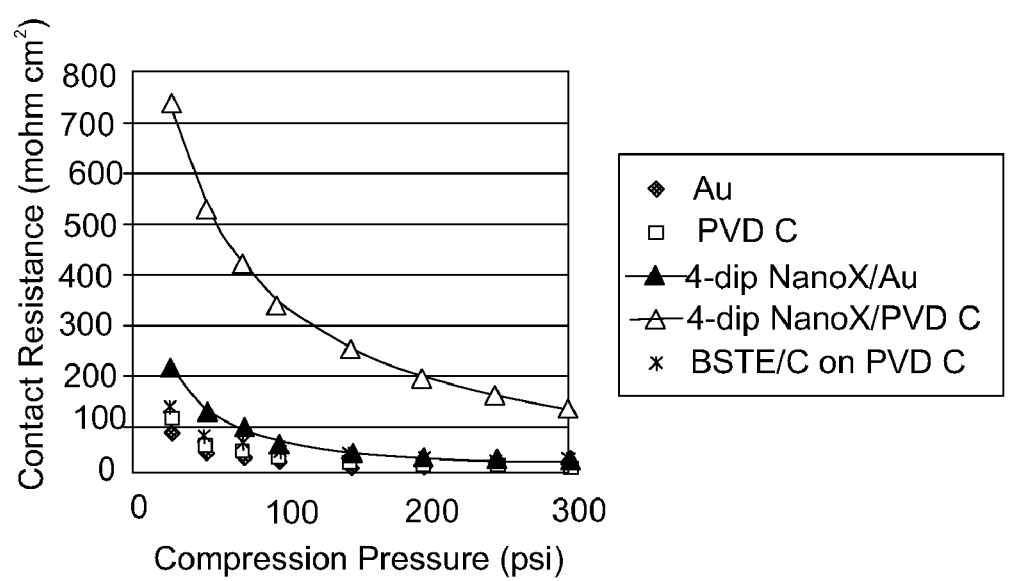
FIG. 6 provides plots of the electrical contact resistance as a function of contact pressure.

FIG. 6 provides plots of the electrical contact resistance as a function of contact pressure. Stainless steel ("SS") samples are coated as follows Au, PVD carbon, 4-dip NanoX/Au, 4-dip coated NanoX/PVD C, and BTSE/carbon on PVD carbon. The Au coated samples are prepared by electroplating. The NanoX samples are prepared from freshly prepared silica sol (10% vol of x-tec hydrophilic silica from NANO-X GmbH) and a polymer solution (0.35 g/l of Superfloc C-442 from Cytec Industries, Inc., 0.05 M $H_2SO_4$). Au-coated and C-coated SS coupons are coated with Nano-X silica and polymer via a 4-dip cycle multilayer absorption ("MLA") process. The Au- and C-coated SS coupons were coated simultaneously using an MLA process. In addition, PVD carbon-coated SS was sprayed coated with BTSE-C coating and contact resistances were compared before and after coating.

The contact resistance of the PVD carbon (conductive) coating increased excessively after application of 4-dip NanoX (hydrophilic and non-conductive silica sol). A lower contact resistance increase was observed for Au (NanoX) after hydrophilic coating application. Though operation of various embodiments of the invention are not limited to any particular theory of operation, it appears that more contact points between the carbon fibers of the GDL and the coating is required for PVD carbon than for Au to maintain a low electrical resistance. The increase in contact resistance of the PVD C/SS sample after coating with BTSE-C is negligible. Accordingly, the BTSE/hydrophilic carbon enables a less conductive underlying coating (e.g., PVD carbon) to be used as flow field plate coatings.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electrically conductive plate for incorporation into a fuel cell, the plate comprising:
   a plate body having a channel-defining surface;
   an electrically conductive hydrophilic layer disposed over at least a portion of the surface of the plate body, the layer comprising:
   residues of a silane-coupling agent; and
   electrically conductive hydrophilic carbon wherein the hydrophilic carbon comprises a carbon component with an appended hydrophilic component.

2. The plate of claim 1 further comprising an intermediate conductive layer between the plate body and the hydrophilic layer.

3. The plate of claim 2 wherein the intermediate conductive layer comprises a metal or a conductive metal oxide or a conductive carbon.

4. The plate of claim 1 wherein the carbon component is selected from the group consisting of carbon black, graphite, carbon fiber, amorphous carbon, carbon nanotubes, and combinations thereof.

5. The plate of claim 1 wherein the hydrophilic component comprises a moiety having the following formula:

$$HG(Ar)—$$

wherein:
— represents the bond to the carbon component;
HG is a hydrophilic group; and
Ar is absent or an aromatic group.

6. The plate of claim 5 wherein HG is OR, COR, COOR, OCOR, COOM, halogen, CN, $NR_2$, $SNSO_3H$, $SO_3M$, NR(COR), $CONR_2$, $NO_2$, $PO_3H_2$, $PO_3HM$, $NR_3^+X^-$, or $PR_3^+X^-$, where R is independently H, $C_1$-$C_{20}$ alkyl, or aryl; n is an integer from 1 to 8; M is a metal; and $X^-$ is a halide anion or anion derived from a mineral or organic acid.

7. The plate of claim 1 wherein the silane-coupling agent has formula I:

$$Q^2\text{-}Q^1\text{-}Si(R^1)_3 \qquad I$$

wherein:
$R^1$ is an alkoxy or a halogen;
$Q^1$ is a moiety having one or more atoms that hydrogen bond or have energetically favorable interactions with water; and
$Q^2$ is a hydrocarbon-containing moiety providing a spatial separation between $Q^1$ and the $Si(R^1)_3$ group.

8. The plate of claim 5 wherein the carbon component comprises electrically conductive particles selected from the group consisting of particulate carbonaceous compounds, crystalline carbon, carbon fiber, amorphous carbon, carbon black, carbon black aggregates, graphite, carbon composites, carbon-coated particles, coated hybrid carbon-based particles and mixtures thereof.

9. The plate of claim 8 wherein the carbon black is present in an amount from about 0.1 to 5 percent of silane solution.

10. An electrically conductive plate for incorporation into a fuel cell, the plate comprising:
    a plate body having a channel-defining surface;
    an intermediate electrically conductive layer disposed over the channel defining surface;
    an electrically conductive hydrophilic layer disposed over the intermediate electrically conductive layer, the electrically hydrophilic conductive layer comprising:
    residues of a silane coupling agent; and
    electrically conductive hydrophilic carbon.

11. The plate of claim 10 wherein the hydrophilic carbon comprises a carbon component with an appended hydrophilic component.

12. The plate of claim 11 wherein the hydrophilic component comprises a moiety having the following formula:

$$HG(Ar)—$$

wherein:
— represents the bond to the carbon component;
HG is a hydrophilic group; and
Ar is absent or an aromatic group.

13. The plate of claim 10 wherein the silane coupling agent has formula I:

$$Q^2\text{-}Q^1\text{-}Si(R^1)_3 \qquad I$$

wherein:
$R^1$ is an alkoxy or a halogen;
$Q^1$ is a moiety having one or more atoms that hydrogen bond or have energetically favorable interactions with water; and
$Q^2$ is a hydrocarbon-containing moiety providing a spatial separation between $Q^1$ and the $Si(R^1)_3$ group.

* * * * *